H. LIPPOLD.
METHOD OF AND MACHINE FOR CASTELLATING NUTS.
APPLICATION FILED APR. 22, 1918.

1,292,821.

Patented Jan. 28, 1919.
3 SHEETS—SHEET 1.

Inventor
Henry Lippold
By
Attorney

H. LIPPOLD.
METHOD OF AND MACHINE FOR CASTELLATING NUTS.
APPLICATION FILED APR. 22, 1918.

1,292,821.

Patented Jan. 28, 1919.
3 SHEETS—SHEET 3.

Inventor
Henry Lippold
By
Attorney

UNITED STATES PATENT OFFICE.

HENRY LIPPOLD, OF ERIE, PENNSYLVANIA.

METHOD OF AND MACHINE FOR CASTELLATING NUTS.

1,292,821.　　　　　　　Specification of Letters Patent.　　Patented Jan. 28, 1919.

Application filed April 22, 1918. Serial No. 229,923.

*To all whom it may concern:*

Be it known that I, HENRY LIPPOLD, a citizen of the United States, residing at Erie, in the county of Erie and State of Pennsylvania, have invented new and useful Improvements in the Methods of and Machines for Castellating Nuts, of which the following is a specification.

This invention relates to the method of and machines for forming castellated nuts and consists in certain improvements therein as will be hereinafter fully described and pointed out in the claims.

In castellating nuts it has been the common practice to secure a series of nuts in alinement, making a cut along said nuts extending diametrically across each nut and then shifting each individual nut so as to bring a new portion of the nut into line for cutting. Machines have also been attempted where cutters extending in different directions are employed.

In the present invention I secure a group of nuts with the faces parallel and present the entire group to a series of cutters, cutting the nuts diametrically in one direction and then turning the nuts *en masse* and then moving them forward so as to slot them in a different direction. In this way it is only necessary to put the individual nuts in the machine at the beginning of the operation and consequently the castellating may be done in much less time. Further the method and apparatus readily lend themselves for application to machines in common use.

The machine is illustrated in the accompanying drawings as follows:—

1 marks the frame, 2 a spindle bearing, 3 a spindle, 4 the drive pulley, 5 the head carrying the cutters, 6 the cutters, 7 the centering support, 8 a tail-piece and 9 a clamping screw for clamping the centering support 7.

Figure 4:
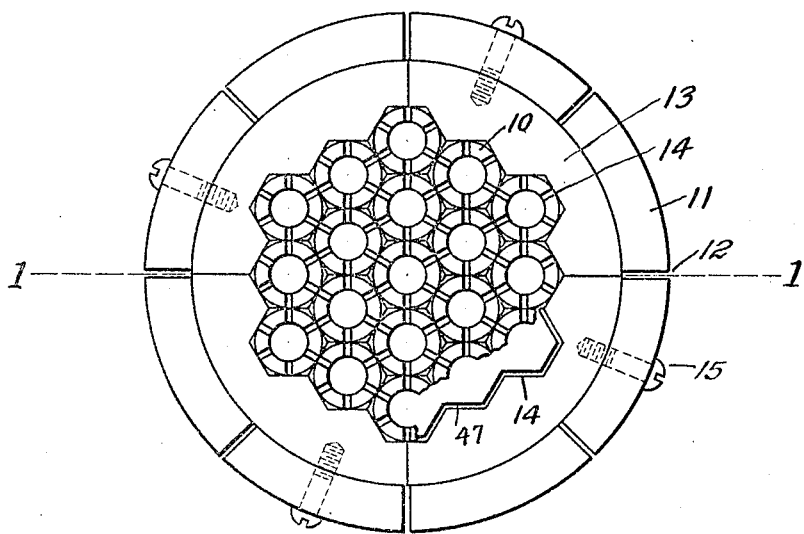
Fig. 4 is an enlarged view of the head for holding the nuts.

Nuts 10 are arranged in rows and clamped in the head. The head is provided with the spring jaws 11. These spring jaws are formed by turning a cup and separating the wall by slots 12. Removable blocks 13 are arranged within the walls formed by the spring jaws and these have the clamping surfaces 14 following the contour of a group of nuts as clearly indicated in Fig. 4.

The blocks are secured by screws 15. The blocks are made removable so that different sizes and shapes of nuts may be handled by the same head.

The outer faces 16 of the jaws 11 are beveled and these faces are engaged by a clamping ring 17 having a corresponding surface. The jaws are carried by the disk 18 and a shank 19 extends from the disk. The lower end of this shank is screw-threaded at 20 and a screw 21 operates on the screw 20. A wheel 22 is provided for operating the screw 21. By operating the wheel the jaws 11 may be drawn downwardly so that the beveled faces 16 operating on the ring 17 crowd the jaws inwardly, thus securely clamping the nuts in the jaws.

The ring 17 is supported by a plate 23. The plate 23 rests on a head 24. The upper end of this head is screw-threaded and provided with a nut 25 by means of which the ring 17 may be adjusted so that the nuts when fully clamped will be at the desired height relatively to the cutters. The head 24 has an extension 26 which is carried in an opening in the slide 27. It is secured in place by a nut 28 below the slide.

The slide 27 operates in the guides 27ª on the frame. It is provided with a screw 29 which is carried by the bearings 30. The screw 29 extends through a nut 31 secured to the frame and is provided with a hand wheel 32 by means of which the slide may be moved forward so that the cutters may form the cut on the nuts carried by the head. The position of the head is controlled by a notched wheel 33. This is locked against turning on the extension 26 by means of a spline 34. It is provided with notches 35, the number of these notches depending upon the number of sides on the nut being operated upon. A ratchet pawl 36 is adapted to engage the notches 35 as the slide is retracted so as to turn the head to position the nuts for the different cuts. The pawl 36 is carried by a pin 37 and is moved into engagement by a spring 38. A locking pawl 39 is carried by a pin 40 mounted on the slide 27. The pawl is yieldingly held in locking position by a spring 41. A knock-out lever 42 is also pivoted on the pin 40. It is provided with a cam 43 which is adapted to engage a pin 44 on the frame as the slide is retracted. It is provided with a pin 45 which is adapted to engage the pawl 39 as an arm is swung through the engagement of the cam 43 with the pin 44 and in consequence of this engagement and swinging of the lever 42, the pawl 39 is carried out of the notch 35, or in other words, out of locking position. A spring 46 yieldingly holds the lever 42 in operative position. When the slide is moving forward the lever 42 is swung so as to clear the pin 44 without any action on the pawl 39.

Figure 1:
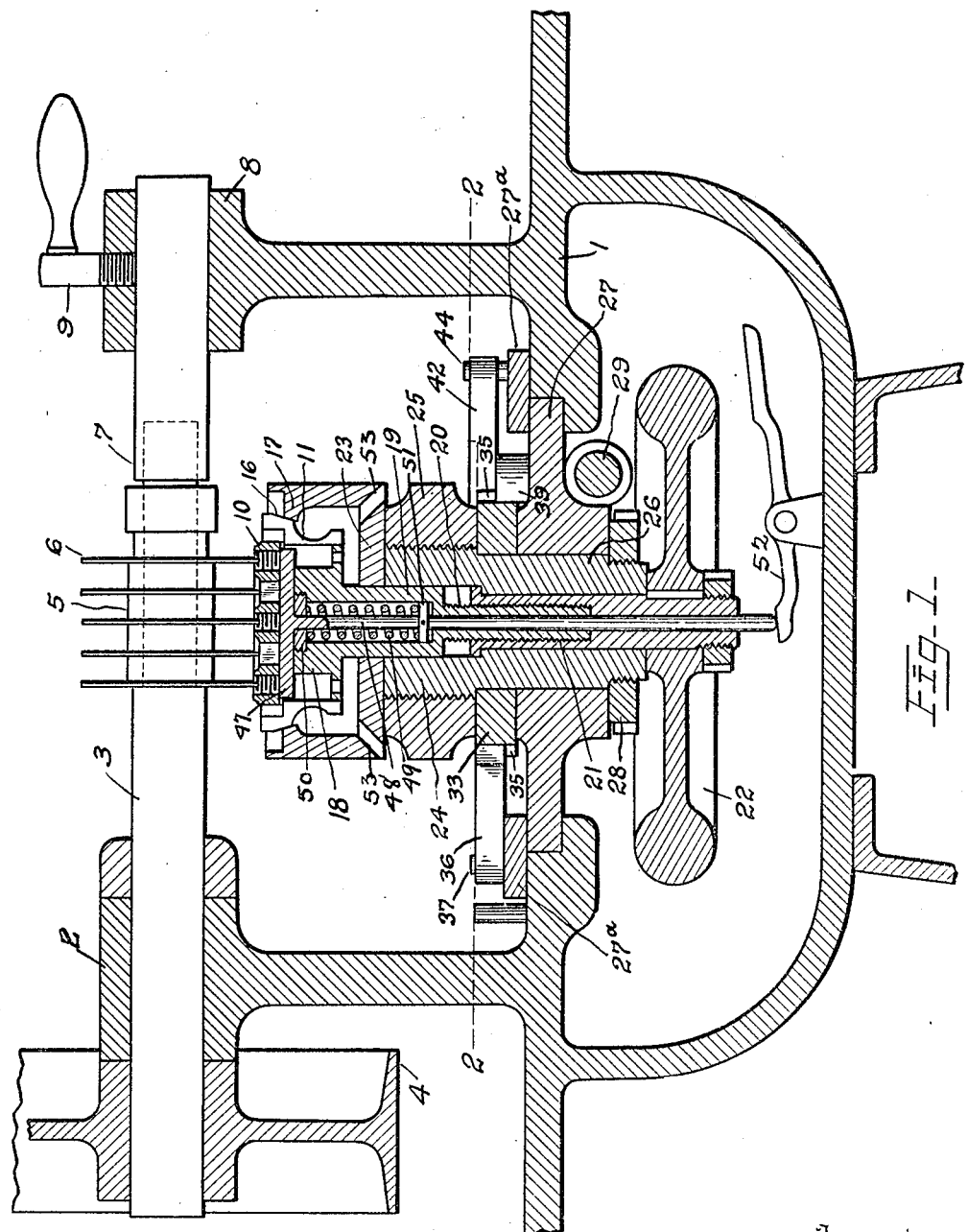
Figure 1 shows a vertical section on the line 1—1 in Fig. 2.
Figure 2:
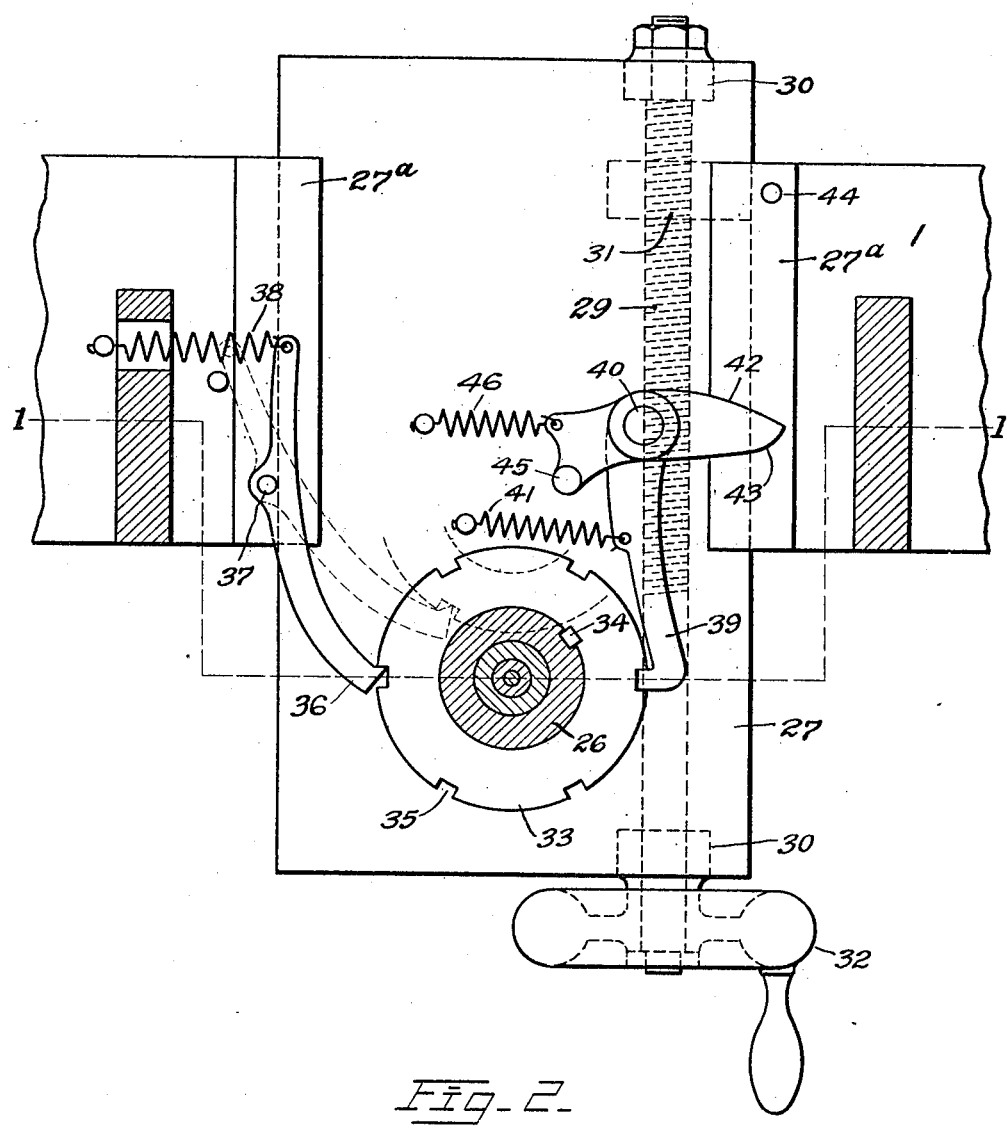
Fig. 2 is a section on the line 2—2 in Fig. 1.
Figure 3:
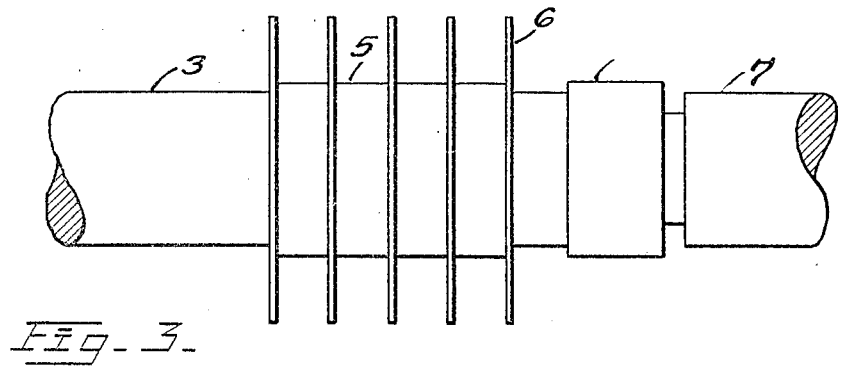
Fig. 3 is an enlarged view of the cutters.

The operation of this part is as follows: When the slide is moved forward the head carrying the nuts is locked by the pawl 39 operating in one of the notches 35. The lever 42 swings clear of the pin 44 without any particular operation. The pawl 36 being carried by the pin 37 on the frame simply swings out of the notch through the action of the cam surface on the end of the pawl. On the return movement of the slide, the slide should be retracted far enough to carry the nuts clear of the cutter. At this point the lever 43 engages the pin 44 and swinging the lever 42 carries the pin 45 into engagement with the pawl 39 and swings it out of locking position. At this moment the pawl 36 engages a notch as shown in dotted lines in Fig. 2 and the continued retraction of the slide rotates the wheel 33 and with it the head carrying the nuts one-sixth revolution so as to bring them into position for another cut. The nuts should be placed so as to line themselves with each turning. With the hexagonal nuts shown it will be readily seen that the axes present lines in three directions, turning the head one-sixth revolution making three cuts, the castellating process is completed and this is completed without manipulating the individual nuts.

In order to facilitate the removal of the nuts from the head I provide a stripper plate 47. A pin 48 extends from this. A spring 49 is seated against a nut 50 and exerts pressure against a collar 51 on the stem. After the head is loosened the stem 48 may be lifted carrying with it the plate 47 by means of a trip lever 52. The plate 47 should follow the outline 14 formed by the blocks 13. Holes 53 are provided to permit the escape of any chips that may get past the plate 47. One of the particular advantages of this method and this construction is that it lends itself to many machines now in use. The machine here shown, except the automatic turning of the head is one in common use. There are several machines, however, that with very little change may be adapted to a utilization of this process and this apparatus.

What I claim as new is:—

1. The method of castellating nuts which consists in securing the nuts in a group with parallel edges by exerting edgewise pressure on the outer units of the group pressing the units of the group together, cutting the nuts diametrically in one direction by a relative movement of the nuts and cutters *en masse*, and cutting the nuts diametrically in a different direction by a relative movement of the nuts and cutters *en masse*, the nuts and cutters remaining in the same grouping during both operations.

2. In a castellating machine, the combination of a series of cutters; a holding head comprising means for clamping a group of nuts with parallel edges by exerting edgewise pressure on the outer units of the group and pressing the units of the group together; means for moving the head relatively to the cutters to form therein diametrical cuts; and devices for swinging the head to change the direction of the cut.

3. In a castellating machine, the combination of a series of cutters; a holding head comprising means for clamping a group of nuts with parallel faces; a discharge plate within the head; means for actuating the discharge plate; means for moving the head relatively to the cutters to form a diametrical cut in the nuts held by the head; and means for swinging the head to change the direction of the cut.

4. In a castellating machine, the combination of a series of cutters; a holding head, comprising a series of spring jaws; a clamping ring operating on the jaws; means for moving the jaws and ring relatively to effect a clamping action of the jaws, said jaws being adapted to hold a group of nuts; means for moving the head relatively to the cutters to form in the nuts held thereby a diametrical cut; and means for swinging the head to position the nuts for diametrical cuts in a different direction.

5. In a castellating machine, the combination of a series of cutters; a holding head provided with a series of movable jaws; removable blocks secured to the jaws and having surfaces of a contour following the outline of a group of nuts; means for actuating the jaws; means for moving the head relatively to the cutters to slot the nuts held by the head diametrically; and means for swinging the head to present the nuts to the cutters to slot them diametrically in a different direction.

In testimony whereof I have hereunto set my hand.

HENRY LIPPOLD